E. C. ALBREE.
MEANS EMPLOYED IN THE ART OF TRANSACTING BUSINESS.
APPLICATION FILED AUG. 7, 1916.

1,258,081.

Patented Mar. 5, 1918.

INVENTOR:
Edward C. Albree
by Macleod, Calver, Copeland & Dike
Attys

UNITED STATES PATENT OFFICE.

EDWARD C. ALBREE, OF SWAMPSCOTT, MASSACHUSETTS.

MEANS EMPLOYED IN THE ART OF TRANSACTING BUSINESS.

1,258,081. Specification of Letters Patent. Patented Mar. 5, 1918.

Application filed August 7, 1916. Serial No. 113,649.

*To all whom it may concern:*

Be it known that I, EDWARD C. ALBREE, a citizen of the United States, residing at Swampscott, county of Essex, State of Massachusetts, have invented a certain new and useful Improvement in Means Employed in the Art of Transacting Business, of which the following is a specification, reference being had therein to the accompanying drawings.

My invention relates to novel means for preventing fraud or theft by employees in stores and the like.

Heretofore in stores and particularly in department stores, difficulty has been experienced from the fact that the physical inventory does not agree with the book record. In department stores the discrepancy between the physical inventory and the book record is sometimes as great as ten per cent. This loss results from various causes; some of these being theft by employees, the delivery of an article on a sales slip calling for an article of a lower price, confusion in the stock, errors in making entries, etc. Difficulty is also experienced because information as to the number of articles of any kind which have been sold and the amount still remaining in stock cannot be quickly obtained or is not accurate thus resulting in poor buying.

My invention has for its object an accounting system and the novel method of employing it which reduces largely or wholly does away with the discrepancy between the physical inventory and the book record of stock on hand. It provides means by which the amount on hand of any particular kind of goods can be instantly and accurately determined, likewise the amount of goods of that kind originally received and the number of and price received for the articles already sold. Other information is also easily obtained from it. The total of goods on hand and the goods sold will always balance with the total goods of that kind received or placed in stock and failure to balance indicates a condition requiring investigation. The system is so devised that the sales person cannot deliver an article of higher price on a sales slip calling for a lesser amount, neither can a theft be covered up by destroying a sales slip, or by omitting one sale from a plurality of sales on a single sales slip.

The system is also of great convenience to the buyer and the person in charge because he can determine instantly from the examination of a single folder the entire history of any lot or kind of goods. He can find out immediately how many articles of any kind were originally purchased, the date of purchase, how many are still on hand, the date when each sale was made and can thus obtain full knowledge as to the comparative salability of the article in question and the stock on hand.

The system differs from the ordinary system in many respects, one important one being that the sales persons do not have in their possession the sales slips but are furnished with them only on delivering to the bookkeeper a tag which is removed from the article sold. The bookkeeper has under his charge a series of holders conveniently made in the form of folders, there being one holder for each kind of article. Each holder contains a complete history of all the transactions relating to this kind of goods. Within these holders is kept a record of the number of articles of that kind which have been received. Sales slips in duplicate stamped with the selling price of the article are placed within the holder. Tags which are also marked with the selling price and have thereon entries duplicating certain entries in the folder are placed on the articles. When a sale is made, the tag is given to the bookkeeper by the sales person and the bookkeeper places it or a coupon thereof in the appropriate holder removing therefrom one of the sales slips. This exchange is an essential feature of the system. This sales slip is then consecutively numbered and dated and given to the sales person who makes it out in the ordinary manner giving one half to the customer and turning the other half in to the cashier's office with the money received for the sale or with a note of the charge account. When the bookkeeper places the tag in the holder, he also places the consecutive number and the date of the sale on the holder so that a complete record of each transaction is to be found in the folder. The consecutive numbering and dating of the sales slips is a matter of great importance because it prevents a theft being covered up by destroying a sales slip or by double entries on the same sales slip since the auditing department will at the end of the day require the production of a sales slip corresponding to each consecutive number and the loss of any slip will be immediately apparent. It can be traced because there will be a record of the sale in the folder.

In the following description I have referred to the holder within which the tags and sales slips for each kind of article are kept as a folder because that is a convenient form for use with ordinary filing systems. It will be understood however, that I do not limit myself to this particular form since other types of holders as for instance envelops or clasps may be employed if desired. Likewise I have shown in the drawings tags in two parts, one of which is to remain with the article when it is sold to the customer and the other of which is to be placed within the holder when the sale is made. I have also described a sales slip which is in duplicate, half being given to the customer and the other half given to the cashier. It will be understood that I do not limit myself to these special forms because other forms may be used without departing from the spirit of my invention.

The invention will be fully understood when taken in connection with the accompanying drawings and the novel features thereof will be pointed out and clearly defined in the claims at the close of this specification.

In the drawings, Figure 1 is a view of a drawer containing a plurality of holders each employed for preserving the data relating to the sales and inventory of one class of articles.

Figure 2:
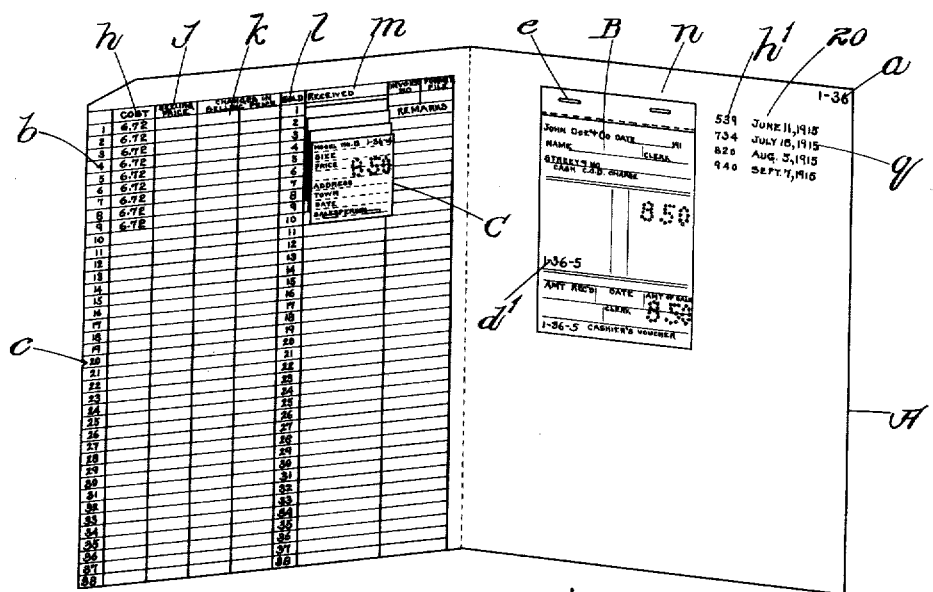
Fig. 2 is a view in perspective of one holder showing sales slips and tags in place therein.
Figure 1:
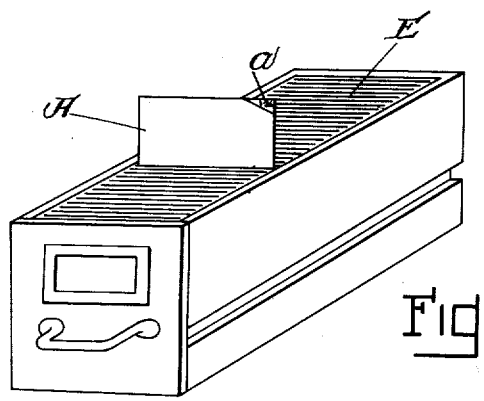

Referring now to the drawings and particularly to Fig. 1, there is shown at E in a filing drawer a series of holders A one of which is shown in detail in Fig. 2. Each holder bears a short description of the article of which it contains the record. This is conveniently in terms of the style and size number as shown at $a$. The holder A is preferably double, and is thus in the form of a folder, and has on one side a column containing numerals $b$ by which are indicated the number of sales slips which have been placed in said folder. A notch $c$ is cut in the edge of the folder adjacent the numeral indicating the number of sales slips which have been put in said folder, and a new notch is cut lower down at the proper point whenever more sales slips are placed in said folder. The notch $c$ affords an indelible mark, as will be understood. Adjacent the column of numerals $b$ is a column $h$ headed "Cost" in which is placed the cost of each article received. In the drawings the notch $c$ is cut opposite the numeral 20 in column $b$ to indicate that twenty sales slips have been put into the folder, and the cost price $6.72 has been entered on the first nine lines in column $h$ under "Cost" to indicate that nine articles have been put in stock and that each cost $6.72. Adjacent the column $h$ are other columns $j$ and $k$ in which may be inscribed certain information. Column $l$ is headed "Sold" and contains numerals in sequence from 1 to 38, the use of which will be explained later. On this page of the folder, is a column $m$ headed "Received" which is intended to receive the tags or coupons C from the goods which have been sold.

Figure 3:
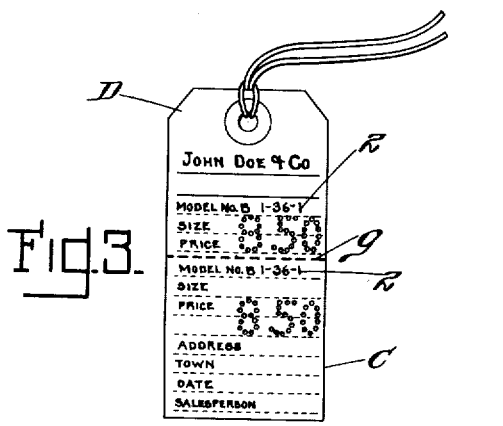
Fig. 3 is a view of a tag.
Figure 4:
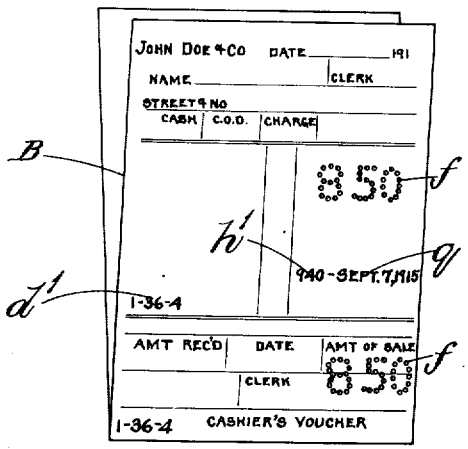
Fig. 4 is a view of a sales slip.

On the opposite page of the folder, below the space $n$, are placed the sales slips B which may be detachably secured to the holder in any suitable manner, as by staples, like $e$, and adjacent this space is another space 20 in which the consecutive number $h'$ and the date $q$ of each sale are placed. The sales slips are provided with the descriptive number as shown at $d'$ which corresponds with the descriptive number $a$ on the folder. The descriptive number is followed by the serial or consecutive number of the sales slip, as hereinbefore set forth. The sales slips are marked with the price of the article as indicated at $f\ f$. It is desirable to stamp the price on the sales slips in such a manner that it cannot be altered. This may be done by a perforating punch as shown in the drawings. The sales slip is in duplicate, one part being given to the customer when the sale is made and the other being sent to the cashier. The tag which is placed on the goods is shown in Fig. 3. Each article will have a tag. The tag is conveniently made in two parts comprising a coupon C and a tag proper D which may be separated from each other along the line $g$. Both halves of the tag are also perforated with the price and both bear the descriptive number as shown at 2. The coupon C may properly be termed a price slip, and the tag D, if it had no coupon and were bodily removed from the article to be attached to the folder, instead of the coupon, might also be properly termed a price slip, these parts having indelible price marks, preferably formed by punching, as do also the sales slips.

Whenever a sale is made, the sales person removes the coupon C from the tag on the goods and hands it to the bookkeeper who fastens it into the folder as shown in Fig. 2. This is easily done by means of a small stapling machine. The bookkeeper then gives to the sales person one of the sales slips B, first stamping on it the consecutive sale number $h'$ and date $q$. At the same time, the same consecutive number and date are stamped below the space 20 on the folder. Each sale slip regardless of the folder from which it is withdrawn is given its consecutive sale number in the general list of sales by the bookkeeper. At the end of the day the auditing department can ascertain the total number of sales made during the day and can make sure that a sales slip has been turned in for every sale that has been made. The duplicate half of the sales slip goes to the cashier's department so that the cashier has a record of the amount received from each of the sales or the person against whose account a charge for it is to be made.

Each tag coupon is placed in the folder with its top edge adjacent one of the numerals in column $l$. By reading the numeral opposite the top of the lowest coupon or tab, one can see at a glance the total number of sales of that article which have been made. Each of the sales slips also has a numeral which indicates its number in the series of sales which have been made from the lot of goods covered by that folder. Thus the top sales slip will be numbered one, the second one two, the third one three and so on. This is conveniently done by adding an extra figure or two to the descriptive number $d'$.

The manner in which the desired information may be obtained from the folder will now be explained. It may be assumed that twenty sales slips have been placed in the folder each being punched $8.50 as shown and that the edge of the folder has been notched as shown at $c$ showing that twenty sales slips have been placed in the folder, that tags punched with the price have been placed on goods and that four sales have already been made. Accordingly there will be four tags or tag coupons C fastened into the folder and the lowest one will be opposite the numeral 4 in the column 2. There will have been removed from the folder four sales slips and the slip on top will have the number 5 appearing at the end of the descriptive number. If, therefore, the head of the department or buyer desires to know how many of these articles are on hand he has only to open the folder and subtract the number opposite the last tag coupon, that is, 4 from the number in column $b$ opposite the lowest entry in the column marked "Cost." In the case shown in the drawings he will subtract the number 4 from 9 and thus see that there are five articles remaining unsold. This may also be checked by the last numeral of the descriptive number on the top sales slip which will always be one more than the number of sales which have been made previously.

When additional goods of this kind are put in stock further entries are made in the cost column and tags are put on the articles.

Since the price of the article is plainly and unchangeably stamped on the tag and on the sales slip, the sales person cannot turn in to the cashier the sales slip with a less amount of money and therefore cannot sell goods for a reduced rate and secrete the difference in amount received. Theft cannot be covered up by destroying a sales slip because the sales slip cannot be obtained until the corresponding tag has been handed to the bookkeeper. The system also affords an excellent check on theft made without any attempt to manipulate the system or shop lifting, because it is very easy for the head of the department or store to go to the folder, ascertain the number of articles on hand as shown by the folder and then go to the shelves or racks and count the number of articles in question. This may be done so easily that periodical inspections may be made with a very small amount of trouble and in this manner the stock may be checked so frequently that theft by employees is practically eliminated.

While I consider this feature of my invention very important, the great ease with which the head of the department or the buyer may instantly ascertain the number of articles of any given kind which have been sold and the number still remaining on hand and the dates when sales were made is of equal importance. The system in the form described herein is applicable to all kinds of goods which are capable of being tagged or labeled, illustrations being shoes, garments, furniture and the like.

What I claim is:

1. A holder provided with a column of numerals and with a number of serially numbered sales slips adapted to be removed therefrom one at a time as each sale is made, said holder being also provided with an indelible mark opposite that one of said numerals which corresponds to the number of said sales slips with which said holder has been provided, and a series of identifying price slips, which were originally attached to the articles sold, fastened into said holder and corresponding in number to the number of sales which have been made of the articles priced on said sales slips, said sales slips and price slips bearing like identifying numbers.

2. A holder provided with a column of numerals and with a number of serially numbered sales slips adapted to be removed from said holder and provided with indelible price marks, said holder being also provided with an indelible mark opposite that one of said numerals which corresponds to the number of said sales slips with which said holder has been provided, said holder having a second column of numerals and a series of identifying price slips, which were originally attached to the articles sold, fastened into said holder adjacent said second column of numerals, with their upper edges substantially alining with said last-named numerals, said price slips corresponding in number to the number of sales which have been made of the articles priced thereon, and said sales slips and price slips bearing like identifying numbers.

3. A holder provided with a series of serially numbered sales slips adapted to be removed therefrom one at a time as each sale is made and having price marks and article-identifying means thereon, and a series of price slips which were originally attached to the articles sold and also having article-identifying means thereon, said price slips being fastened to said holder and corresponding in number to the number of sales which have been made of the articles priced on said sales slips.

4. A holder provided with a series of serially numbered sales slips adapted to be removed therefrom one at a time as each sale is made, and having price marks and article-identifying means thereon, and a series of price slips also having article-identifying means thereon and which price slips were originally attached to the article sold, said price slips being fastened to said holder and corresponding in number to the number of sales which have been made of the articles priced on said sales slips, said sales slips and price slips being provided with like article-identifying numbers.

5. A holder provided with a series of serially numbered pre-written sales slips adapted to be removed from said holder and having means for identifying the articles to be sold and indelible price marks thereof thereon, and a series of price slips which were originally attached to the articles identified and priced on the sales slips, fastened to said holder and corresponding in number to the number of sales slips which have been removed from said holder, said price slips also having article-identifying marks and indelible price marks corresponding to the article-identifying marks and price marks on said sales slips, and said sales slips and price slips having like identifying serial numbers.

In testimony whereof I affix my signature, in presence of two witnesses.

EDWARD C. ALBREE.

Witnesses:
GEORGE P. DIKE,
ALICE H. MORRISON.